(12) United States Patent
Ishizuka (10) Patent No.: US 9,989,803 B2
(45) Date of Patent: *Jun. 5, 2018

(54) DISPLAY DEVICE

(71) Applicant: Funai Electric Co., Ltd., Daito, Osaka (JP)

(72) Inventor: Yuki Ishizuka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/600,916

(22) Filed: May 22, 2017

(65) Prior Publication Data

US 2017/0255059 A1 Sep. 7, 2017

Related U.S. Application Data

(63) Continuation of application No. 14/520,644, filed on Oct. 22, 2014, now Pat. No. 9,664,949.

(30) Foreign Application Priority Data

Nov. 11, 2013 (JP) .................. 2013-233237

(51) Int. Cl.
*G09F 13/04* (2006.01)
*G02F 1/1335* (2006.01)
*G02F 1/1333* (2006.01)

(52) U.S. Cl.
CPC .. *G02F 1/133605* (2013.01); *G02F 1/133603* (2013.01); *G02F 1/133608* (2013.01); *G02F 2001/133314* (2013.01); *G02F 2202/28* (2013.01)

(58) Field of Classification Search
CPC ......... G02F 1/133603; G02F 1/133608; G02F 2202/28; G02F 2001/13314
See application file for complete search history.

(56) References Cited

U.S. PATENT DOCUMENTS

| 9,664,949 B2* | 5/2017 | Ishizuka ........... G02F 1/133605 |
| 2007/0018312 A1* | 1/2007 | Jo .......................... H01L 23/36 |
| | | 257/720 |
| 2007/0189011 A1* | 8/2007 | Song ................. G02F 1/133603 |
| | | 362/294 |

(Continued)

FOREIGN PATENT DOCUMENTS

| JP | 2007-200869 A | 8/2007 |
| JP | 2008-198398 A | 8/2008 |

(Continued)

*Primary Examiner* — Ali Alavi
(74) *Attorney, Agent, or Firm* — Global IP Counselors, LLP (57) ABSTRACT

A display device includes a display panel, a rear face housing, a light source unit, a reflective sheet, and a fixing member. The rear face housing is disposed rearward with respect to a rear face of the display panel. The light source unit is disposed between the display panel and the rear face housing. The reflective sheet has an opening. A portion of the reflective sheet around the opening is disposed between at least part of the light source unit and the rear face housing in a direction perpendicular to a surface of the display panel. The fixing member attaches the light source unit to the rear face housing.

20 Claims, 11 Drawing Sheets (56) References Cited

U.S. PATENT DOCUMENTS

| | | | | |
|---|---|---|---|---|
| 2009/0103282 A1* | 4/2009 | Itaya | ............... | G02B 6/0068 362/97.1 |
| 2009/0168405 A1* | 7/2009 | Yoo | ............... | G02F 1/133608 362/97.2 |
| 2011/0199556 A1* | 8/2011 | Oohira | ............... | G02F 1/133308 349/62 |
| 2013/0208509 A1* | 8/2013 | Cheng | ............... | G02F 1/133382 362/613 |

FOREIGN PATENT DOCUMENTS

| | | |
|---|---|---|
| JP | 2010-210891 A | 9/2010 |
| JP | 2013-164943 A | 8/2013 |
| WO | 2011-033899 A1 | 3/2011 |

* cited by examiner

DISPLAY DEVICE

CROSS-REFERENCE TO RELATED APPLICATIONS

This is a continuation application of U.S. patent application Ser. No. 14/520,644, which claims priority to Japanese Patent Application No. 2013-233237 filed on Nov. 11, 2013. The entire disclosures of U.S. patent application Ser. No. 14/520,644 and Japanese Patent Application No. 2013-233237 are hereby incorporated herein by reference.

BACKGROUND

Field of the Invention

The present invention generally relates to a display device for displaying images.

Background Information

An example of a known display device for displaying images is a liquid crystal television receiver. A liquid crystal television receiver is equipped with a backlight unit that shines light at the rear face of a liquid crystal cell (see Japanese Unexamined Patent Application Publication No. 2010-210891 (Patent Literature 1), for example). One type of backlight unit is a direct backlight in which the light source is disposed directly under the liquid crystal cell. A direct backlight has a wiring board, a plurality of LEDs (light emitting diodes) that are mounted on the front side of the wiring board, and a reflective sheet for reflecting the light from the LEDs toward the rear face of the liquid crystal cell.

With a conventional direct backlight, the wiring board is fixed to the rear frame by double-sided adhesive tape. The double-sided adhesive tape is affixed to the entire rear face of the wiring board. The reflective sheet is attached to the rear frame so as to cover the wiring board. At this point, the LEDs mounted on the wiring board are exposed through a plurality of holes made in the reflective sheet.

Furthermore, with a conventional direct backlight, a holder is used to reduce sagging of the reflective sheet. This holder has a hold-down component and a sandwiching component. The hold-down component holds down the reflective sheet from the liquid crystal cell side, and the sandwiching component goes through the reflective sheet and sandwiches the wiring board from the short-side direction, so that the reflective sheet and the wiring board are fixed together. This reduces sagging of the reflective sheet to the liquid crystal cell side.

SUMMARY

However, the following problems are encountered with the conventional display device discussed above. The hold-down component of the above-mentioned holder sticks far out from the surface of the reflective sheet toward the liquid crystal cell side. Therefore, the LEDs have to be disposed sufficiently far away from the holder so that the holder will not block part of the light from the LEDs. The problem with this is that there is less latitude in the optical layout of the LEDs. Another problem is that using the above-mentioned holder drives up the cost of manufacturing the display device.

One aspect is to provide a display device that can be manufactured at a lower cost and with which greater latitude is afforded in the optical layout in disposing the light source.

In view of the state of the known technology, a display device provided that includes a display panel, a rear face housing, a light source unit, a reflective sheet, and a fixing member. The rear face housing is disposed rearward with respect to a rear face of the display panel. The light source unit is disposed between the display panel and the rear face housing. The reflective sheet having an opening. A portion of the reflective sheet around the opening is disposed between at least part of the light source unit and the rear face housing in a direction perpendicular to a surface of the display panel. The fixing member attaches the light source unit to the rear face housing.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Specifically, the numerical values, shapes, materials, constituent elements, layout positions and connection modes of the constituent elements, and so forth given in the following embodiments are provided all just for illustration only and not for the purpose of limiting the present invention. The present invention is merely defined by the appended claims. Of the constituent elements in the following embodiments, those not mentioned in an independent claim are not necessarily needed to achieve the object of the present invention, and will be described for understanding of the embodiments.

First Embodiment

External Structure of Display Device

Figure 1:
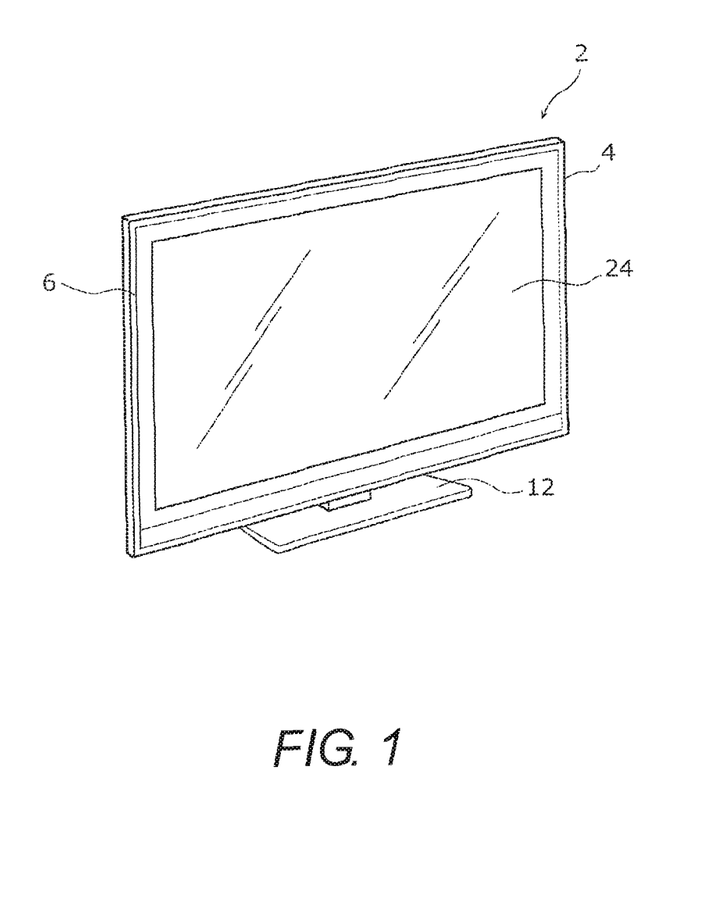
FIG. 1 is a perspective view of the front face side of a display device in accordance with a first embodiment.
Figure 2:
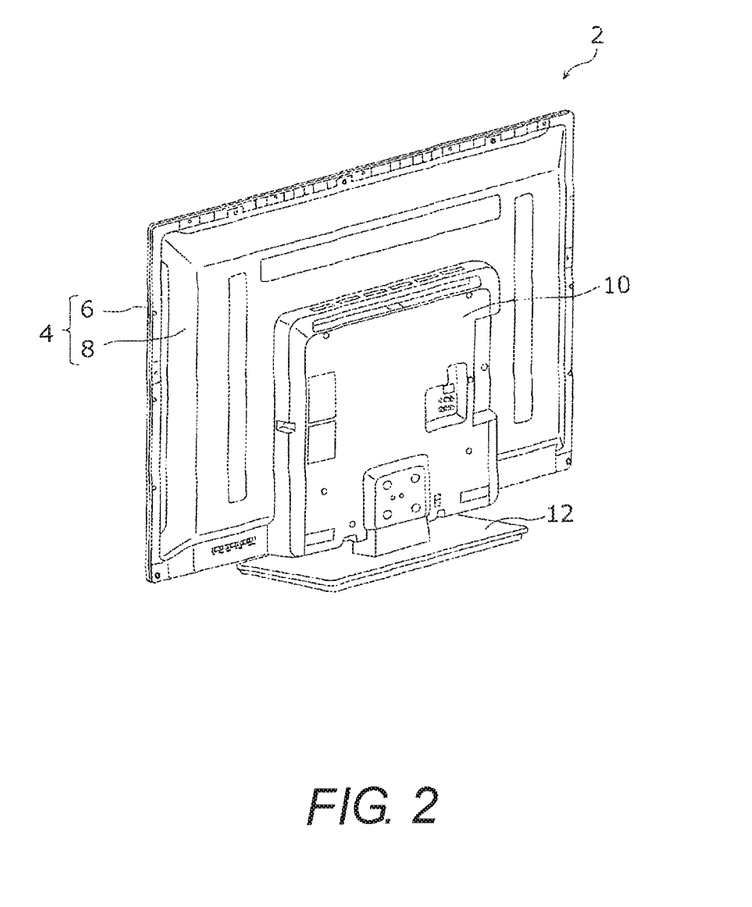
FIG. 2 is a perspective view of the rear face side of the display device in accordance with the first embodiment.

First, the external structure of a display device 2 in accordance with a first embodiment will be described through reference to FIGS. 1 and 2. FIG. 1 is a perspective view of the front face side of the display device 2 in accordance with the first embodiment. FIG. 2 is a perspective view of the rear face side of the display device 2 in accordance with the first embodiment.

As shown in FIGS. 1 and 2, the display device 2 in this embodiment is a liquid crystal television receiver. The display device 2 includes a housing 4. The housing 4 has a front cabinet 6 and a rear frame 8 (e.g., a rear face housing) that are fitted together.

The front cabinet 6 is configured in the form of a frame, and covers the outer peripheral part of a liquid crystal cell 24 described below (e.g., a display panel). The front cabinet 6 is formed from plastic, for example.

The rear frame 8 is disposed so as to cover the rear face side of the liquid crystal cell 24. A flange 8a (see FIG. 4; discussed below) is provided to the outer peripheral part of the rear frame 8. The rear frame 8 is formed from sheet metal, such as SECC (steel electrically chromate coated).

A rear cover 10 is attached to the outer face of the rear frame 8. The rear cover 10 is formed from plastic, for example. A power supply board or the like (not shown) for supplying electrical power to the liquid crystal cell 24 is housed inside the rear cover 10. A stand 12 for supporting the housing 4 from below is attached to the lower end of the rear cover 10.

Internal Structure of Display Device

Figure 3:
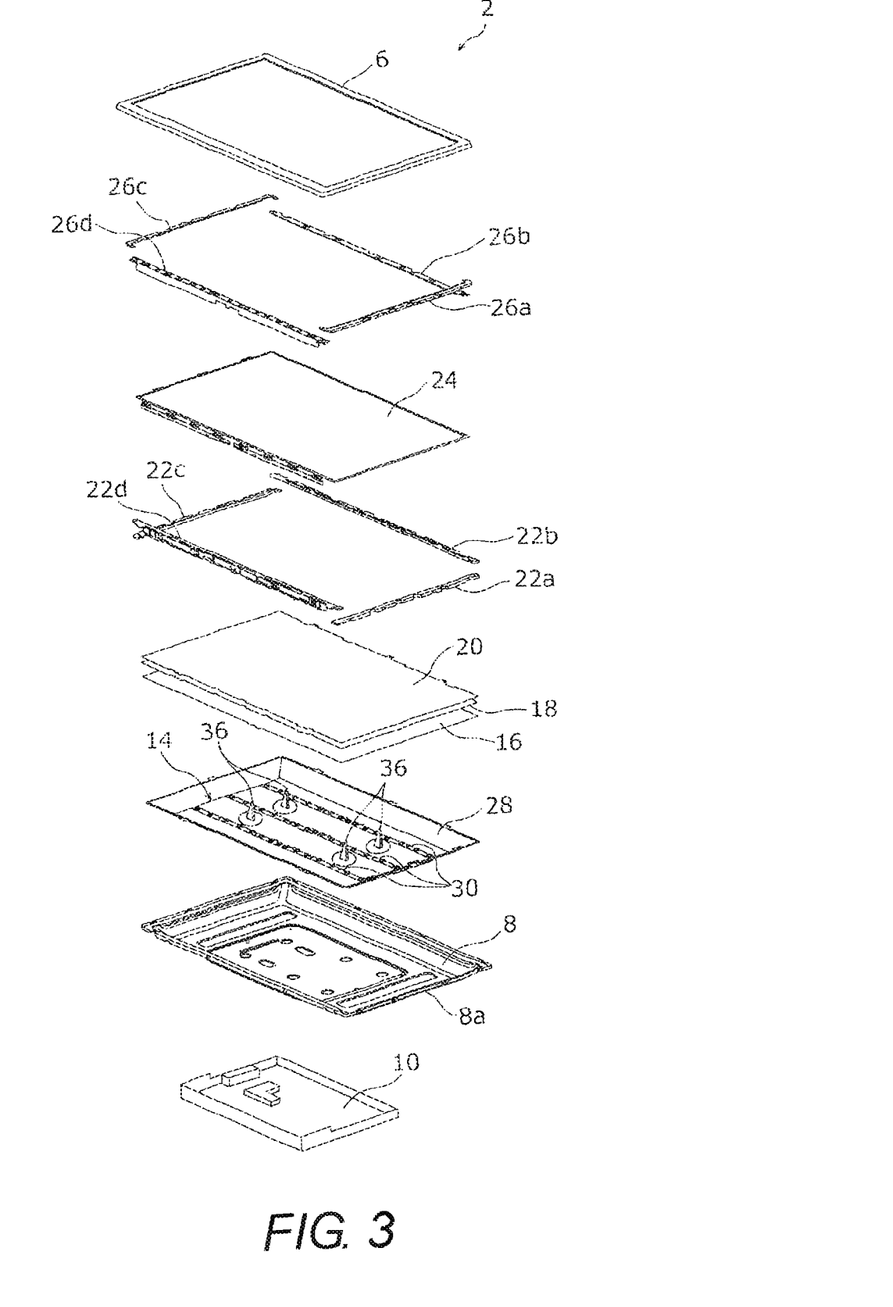
FIG. 3 is an exploded perspective view of the state when the display device in accordance with the first embodiment has been exploded.
Figure 4:
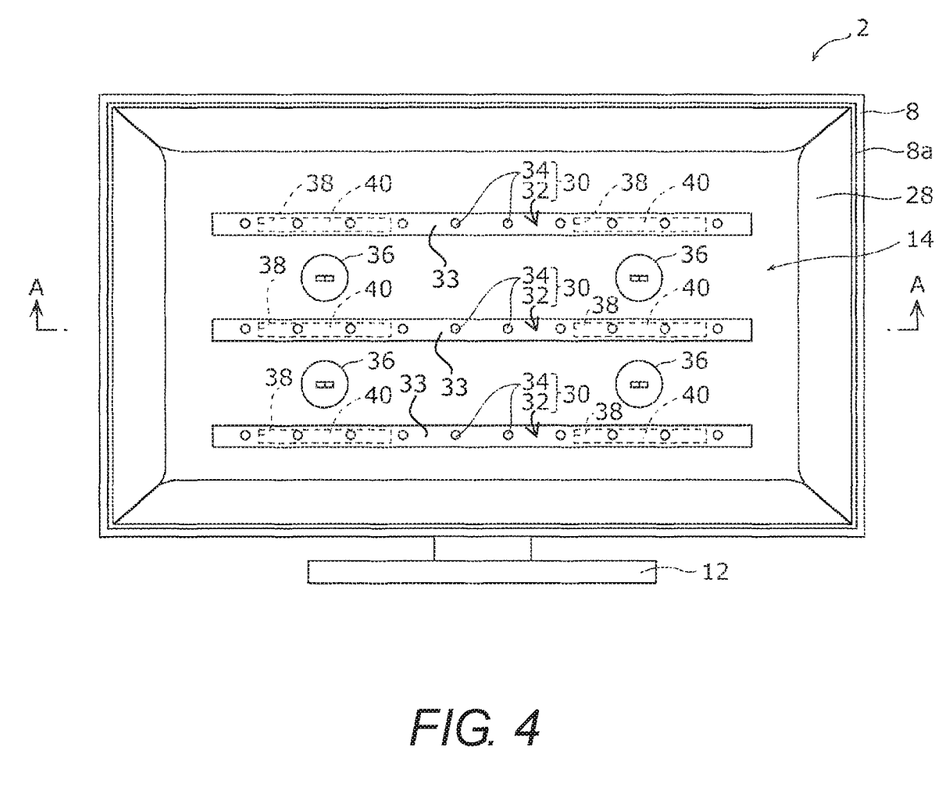
FIG. 4 is a front elevational view of the internal structure of the display device in accordance with the first embodiment.
Figure 5:
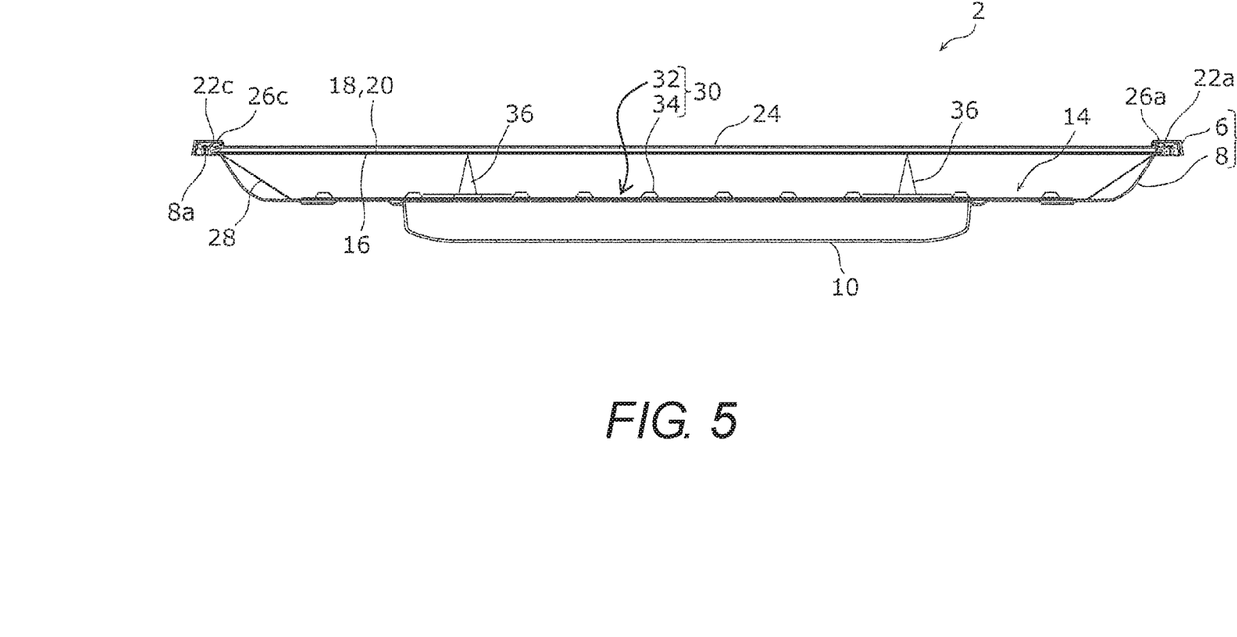
FIG. 5 is a cross sectional view of the display device, taken along A-A line in FIG. 4.

The internal structure of the display device 2 will now be described through reference to FIGS. 3 to 5. FIG. 3 is an exploded perspective view of the state when the display device 2 in accordance with the first embodiment has been exploded. FIG. 4 is a front elevational view of the internal structure of the display device 2 in accordance with the first embodiment. FIG. 5 is a cross sectional view of the display device 2, taken along A-A line in FIG. 4.

As shown in FIG. 3, a backlight unit 14, a diffuser 16, a pair of optical sheets 18 and 20, a plurality of (four in FIG. 3) cell guides 22a to 22d, the liquid crystal cell 24, and a plurality of (four in FIG. 3) bezels 26a to 26d are disposed between the front cabinet 6 and the rear frame 8.

As shown in FIGS. 3 to 5, the backlight unit 14 is a direct backlight unit, and is used to shine light at the rear face of the liquid crystal cell 24. The backlight unit 14 has a reflective sheet 28 and a plurality of (three in FIG. 3) LED bars 30.

The reflective sheet 28 is disposed so as to cover the inner face of the rear frame 8. The reflective sheet 28 is used to reflect light from the LED bars 30 toward the rear face of the liquid crystal cell 24. The reflective sheet 28 is formed from an acrylic plastic, for example.

The LED bars 30 are disposed substantially parallel to each other and spaced apart relative to each other. The LED bars 30 each have a wiring board 32 (e.g., a substrate) and a plurality of (ten in FIG. 4) LEDs 34 (e.g., at least one light sources) mounted on the front of the wiring board 32.

The wiring board 32 is configured in the form of a long, slender plate. The wiring board 32 is formed from a metal with high thermal conductivity, such as aluminum. A white resist layer 33 that has the same reflectivity as the reflective sheet 28, for example, is formed on the front of the wiring board 32 (that is, the side where the LEDs 34 are mounted). The wiring board 32 is disposed over the reflective sheet 28. The wiring board 32 and the reflective sheet 28 are fixed together in order to keep the reflective sheet 28 from sagging toward the liquid crystal cell 24 side. With the display device 2 in this embodiment, the fixing structure is used to fix the wiring board 32 and the reflective sheet 28 together. This fixing structure will be discussed below. In the illustrated embodiment, the white resist layer 33 is formed to define a surface (e.g., a reflective surface) of the wiring board 32. However, alternatively, the wiring board 32 can be formed without the white resist layer 33.

The LEDs 34 are disposed spaced apart relative to each other and are arranged in a single row on the wiring board 32 in the lengthwise direction of the wiring board 32. Each of the LEDs 34 is formed by a power LED, for example. In the illustrated embodiment, the LEDs 34 are equidistantly spaced apart with respect to each other, for example.

As shown in FIGS. 3 and 5, the diffuser 16 is configured in the form of a thin, rectangular plate, and is disposed between the backlight unit 14 and the liquid crystal cell 24. The diffuser 16 is used to diffuse light from the backlight unit 14 toward the rear face of the liquid crystal cell 24. A plurality of support members 36 are disposed over the reflective sheet 28. Each of the support members 36 is used to keep the diffuser 16 from sagging toward the backlight unit 14 side, and supports the rear face of the diffuser 16. Each of the support members 36 also has the function of fixing the reflective sheet 28 and the rear frame 8 together.

The pair of optical sheets 18 and 20 is disposed so as to cover the front of the diffuser 16, with the two sheets superposed one over the other. Each of the optical sheets 18 and 20 is used to guide light diffused by the diffuser 16 to the rear face of the liquid crystal cell 24.

As shown in FIG. 5, the outer peripheral parts of the above-mentioned reflective sheet 28, the diffuser 16, and the optical sheets 18 and 20 are supported by the flange 8a of the rear frame 8.

The four cell guides 22a to 22d are configured in a long, slender shape. The four cell guides 22a to 22d are fitted together to form a rectangular frame overall. The four cell guides 22a to 22d that have been fitted into a frame shape are attached to the flange 8a of the rear frame 8.

The liquid crystal cell 24 is configured in the form of a rectangular panel. The outer peripheral part of the rear face side of the liquid crystal cell 24 is supported by the four cell guides 22a to 22d that have been fitted into a frame shape. When light from the backlight unit 14 shines on the rear face of the liquid crystal cell 24, an image is displayed on the liquid crystal cell 24.

Each of the four bezels 26a to 26d is configured in a long, slender shape. When the four bezels 26a to 26d are fitted together, they make a rectangular frame shape overall. The four bezels 26a to 26d that have been fitted into a frame shape cover the outer peripheral part on the front side of the liquid crystal cell 24.

The front cabinet 6 is attached to the rear frame 8 so as to cover the four bezels 26a to 26d that have been fitted together into a frame.

Fixing Structure

Figure 6:
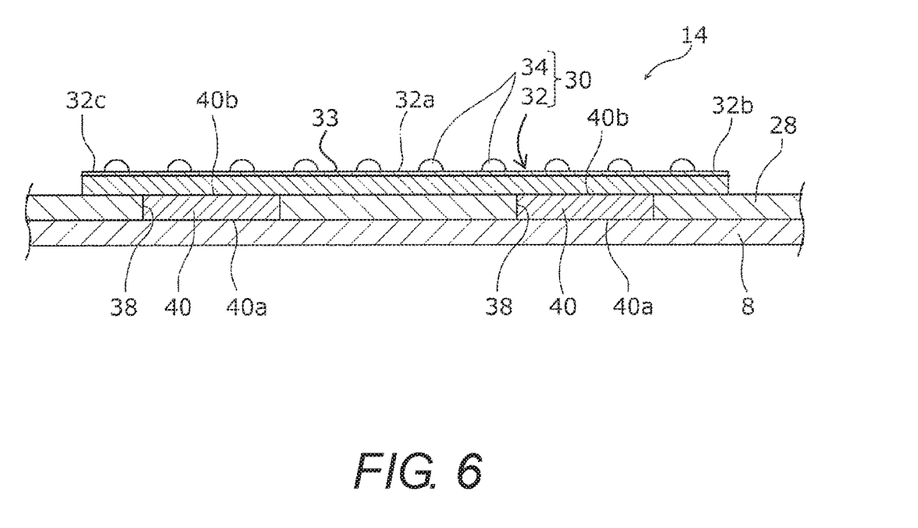
FIG. 6 is a detail cross sectional view of part of a backlight unit of the display device in FIG. 5.
Figure 7:
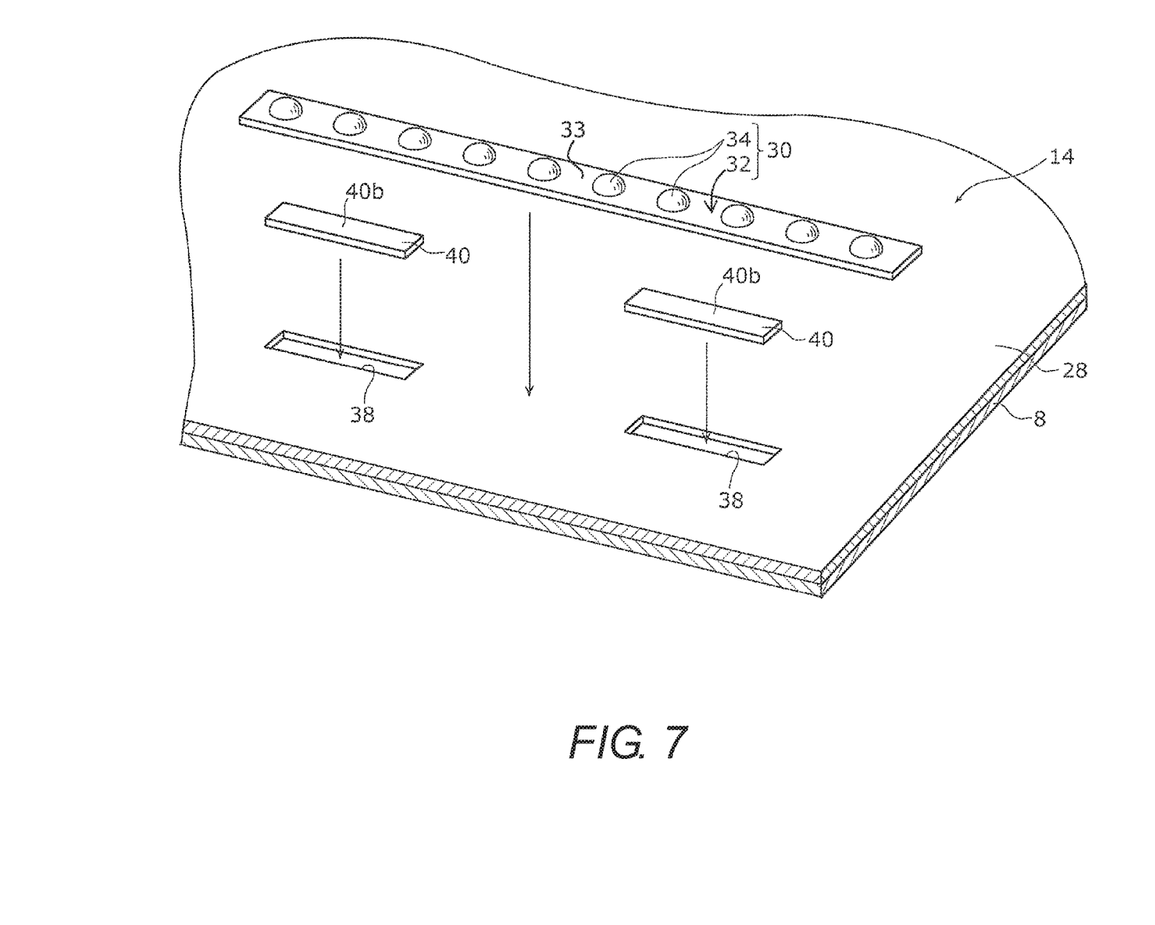
FIG. 7 is an exploded, partial perspective view of the state when part of the backlight unit has been exploded.

The fixing structure that is used to fix the wiring board 32 and the reflective sheet 28 together will now be described through reference to FIGS. 4, 6, and 7. FIG. 6 is a detail cross sectional view of part of the backlight unit 14 of the display device 2 in FIG. 5. FIG. 7 is an exploded, partial perspective view of the state when part of the backlight unit 14 has been exploded.

As shown in FIGS. 4, 6, and 7, a pair of openings 38 is provided for each of the wiring boards 32. The openings 38 are disposed at the portion of the reflective sheet 28 corresponding to the place where the wiring board 32 is disposed (that is, the portion covered by the wiring board 32). Each of the openings 38 is configured in the form of a rectangular shape that is wider than it is tall, and that extends in the lengthwise direction of the wiring board 32. The pair of the openings 38 are spaced apart in the lengthwise direction of the wiring board 32. Specifically, the openings 38 are disposed closer to ends 32b and 32c in the lengthwise direction than to the center 32a in the lengthwise direction of the wiring board 32, respectively.

A plurality pieces of double-sided adhesive tape 40 having thermal conductivity (e.g., a fixing member) are disposed in the openings 38, respectively. The pieces of the double-sided adhesive tape 40 have a shape corresponding to the shape of the openings 38, and are formed from an acrylic material, for example. A first adhesive face 40a of the double-sided adhesive tape 40 is affixed to the inner face of the rear frame 8 exposed through the opening 38. A second adhesive face 40b on the opposite side of the double-sided adhesive tape 40 from the first adhesive face 40a is affixed to the rear face of the wiring board 32 (that is, the face on the opposite side from the surface where the LEDs 34 are mounted). Thus, in the illustrated embodiment, the double-sided adhesive tape 40 is disposed within each of the openings 38 of the reflective sheet 28 such that the double-sided adhesive tape 40 is attached to both the wiring board 32 and the rear frame 8.

Consequently, the pieces of the double-sided adhesive tape 40 fix the wiring board 32 to the rear frame 8 through the corresponding openings 38. Because each of the wiring boards 32 is thus fixed to the rear frame 8, part of the reflective sheet 28 (namely, the portions covered by the wiring boards 32, and the portions where the openings 38 are not provided) is sandwiched between the wiring boards 32 and the rear frame 8. As a result, the wiring boards 32 and the reflective sheet 28 are fixed together, and this keeps the reflective sheet 28 from sagging toward the liquid crystal cell 24 side.

The procedure for fixing the wiring boards 32 to the rear frame 8 will now be described briefly. First, the reflective sheet 28 is attached to the inner face of the rear frame 8. Then, the first adhesive face 40a of the double-sided adhesive tape 40 is attached to the inner face of the rear frame 8 exposed through the opening 38. After this, the wiring board 32 is placed on the reflective sheet 28, which affixes the second adhesive face 40b of the double-sided adhesive tape 40 to the rear face of the wiring board 32. This fixes the wiring board 32 to the rear frame rear frame 8 with the two pieces of double-sided adhesive tape 40.

Instead of the above procedure, the wiring board 32 may be fixed to the rear frame 8 by the following procedure, for example. First, the reflective sheet 28 is attached to the inner face of the rear frame 8. Then, the second adhesive face 40b of the double-sided adhesive tape 40 is pre-affixed to the rear face of the wiring board 32. After this, the wiring board 32 to which the double-sided adhesive tape 40 has been affixed is placed on the reflective sheet 28, which affixes the first adhesive face 40a of the double-sided adhesive tape 40 to the inner face of the rear frame 8 exposed through the opening 38.

Effect

Next, the effect obtained with the display device 2 in this embodiment will be described. As discussed above, the pair of the pieces of the double-sided adhesive tape 40 fixes respective one of the wiring boards 32 to the rear frame 8 through the corresponding openings 38. Consequently, part of the reflective sheet 28 is sandwiched between the wiring boards 32 and the rear frame 8, and the wiring boards 32 and the reflective sheet 28 are fixed together. As a result, since the wiring boards 32 and the reflective sheet 28 can be fixed together without using a conventional holder, it is less likely that light from the LEDs 34 will be blocked, regardless of the layout of the LEDs 34, and this affords greater latitude in the optical layout of the LEDs 34. Furthermore, since the conventional holder can be eliminated, the cost of manufacturing the display device 2 can be reduced by a corresponding amount.

With the display device 2 in this embodiment, part of the reflective sheet 28 is covered by the wiring boards 32. However, since the white resist layers or films 33 are formed on the front of the wiring boards 32 as mentioned above, part of the light from the LEDs 34 will be reflected by the front of the wiring boards 32. This allows the light from the LEDs 34 to be efficiently guided to the rear face of the liquid crystal cell 24.

Furthermore, the following effect can be obtained with the display device 2 in this embodiment. As the LEDs 34 are lit, heat from the LEDs 34 is transmitted through the wiring boards 32 and the pieces of the double-sided adhesive tape 40 to the rear frame 8, and then dissipates from the rear frame 8. In general, with the LED bars 30 in which the LEDs 34 are arranged in the lengthwise direction of the wiring boards 32, heat from the LEDs 34 tends to concentrate in the centers 32a of the wiring boards 32. With the display device 2 in this embodiment, the pieces of double-sided adhesive tape 40 are disposed closer to the ends 32b and 32c of the wiring boards 32 in the lengthwise direction than to the centers 32a in the lengthwise direction of the wiring boards 32. Thus, heat from the centers 32a of the wiring boards 32 will be transmitted to the rear frame 8 along a path that diverts around the reflective sheet 28 directly below, and goes through the double-sided adhesive tape 40. As a result, the heat transmission efficiency from the centers 32a of the wiring boards 32 to the rear frame 8 will be relatively low, which keeps the temperature of the rear frame 8 from rising. This allows the temperature of the rear frame 8 exposed on the outside of the display device 2 to be maintained at or below the standard temperature (such as 30° C.) recommended by UL (Underwriters Laboratories, Inc.) standards.

Also, an air layer may be formed in place of the reflective sheet 28 directly under the centers 32a of the wiring boards 32 in order to divert the heat from the centers 32a of the wiring boards 32 around the reflective sheet 28 directly below, and transmit it to the rear frame 8.

Second Embodiment

Figure 8:
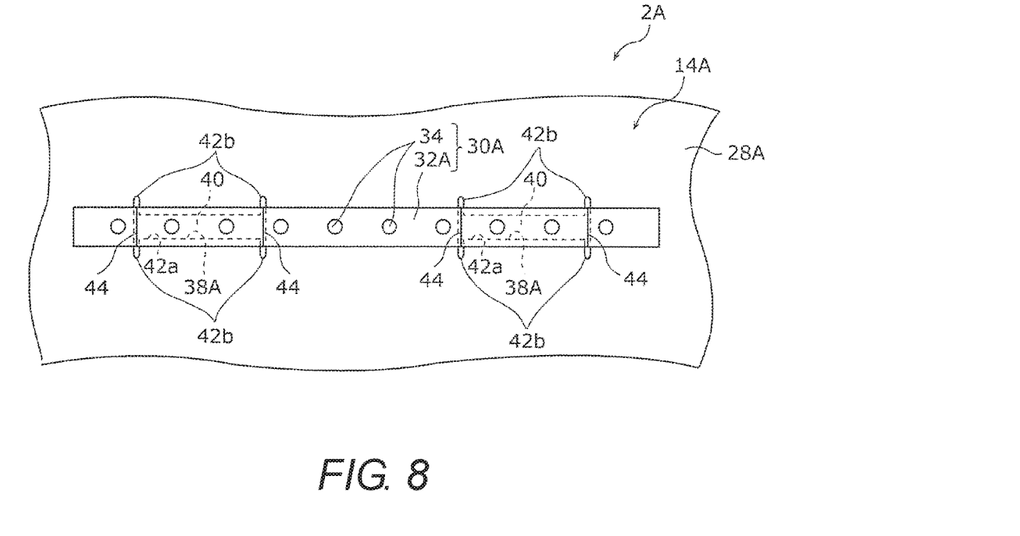
FIG. 8 is a front elevational view of part of a backlight unit of a display device in accordance with a second embodiment.
Figure 9:
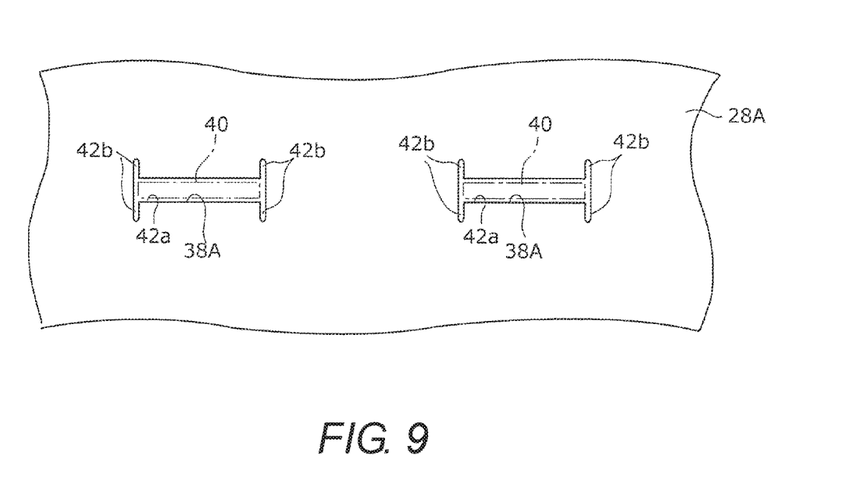
FIG. 9 is a front elevational view of part of a reflective sheet in FIG. 8.

Referring now to FIGS. 8 and 9, a display device 2A in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 8 is a front elevational view of part of a backlight unit 14A of the display device 2A in accordance with the second embodiment. FIG. 9 is a front elevational view of part of a reflective sheet 28A in FIG. 8. In the various embodiments discussed below, those constituent elements that are the same as in the first embodiment above will be numbered the same and will not be described again.

As shown in FIGS. 8 and 9, with the backlight unit 14A of the display device 2A in this embodiment, the reflective sheet 28A has a pair of openings 38A for each of wiring boards 32A. Each of the openings 38A of the reflective sheet 28A has a main opening 42a and a pair of slits 42b. The main openings 42a are covered by the wiring boards 32A, respectively, and are configured in the form of a rectangular shape that is wider than it is tall and extends in the lengthwise direction of the corresponding wiring board 32A. A piece of double-sided adhesive tape 40 is disposed within each of the main openings 42a. The slits 42b extend substantially perpendicular to the lengthwise direction of the corresponding wiring board 32A, from the two ends in the lengthwise direction of the corresponding main opening 42a. As shown in FIG. 8, in a state in which the wiring boards 32A have been placed on the reflective sheet 28A, the distal ends of the slits 42b are exposed, and not covered by the wiring boards 32A. Thus, in the illustrated embodiment, the main opening 42a has an overall rectangular shape. Also, the slits 42b extend from two ends of the main opening 42a in a direction perpendicular to the lengthwise direction of the main opening 42a, and has a larger dimension in the direction than the main opening 42a. Furthermore, the double-sided adhesive tape is disposed within the main opening 42a of the reflective sheet 28A such that the double-sided adhesive tape is attached to both the wiring board 32A and the rear frame 8.

Furthermore, with the backlight unit 14A of the display device 2A in this embodiment, markings 44 formed by silkscreen printing, for example, are provided to the front of the wiring boards 32A of the LED bars 30A. The markings 44 are line-shaped marks extending substantially perpendicular to the lengthwise direction of the corresponding wiring board 32A. The markings 44 are made at locations corresponding to the slits 42b, respectively.

With the display device 2A in this embodiment, the following effects can be obtained in addition to the effects described for the first embodiment above. When the wiring boards 32A are fixed to the rear frame 8, the wiring boards 32A can be easily positioned with respect to the reflective sheet 28A by aligning the positions of the markings 44 with the position of the slits 42b. In the illustrated embodiment, the wiring board 32A can also include a white resist layer, which is identical to the white resist layer 33 as described in the first embodiment, to define a surface (e.g., a reflective surface) of the wiring board 32A.

Third Embodiment

Figure 10:
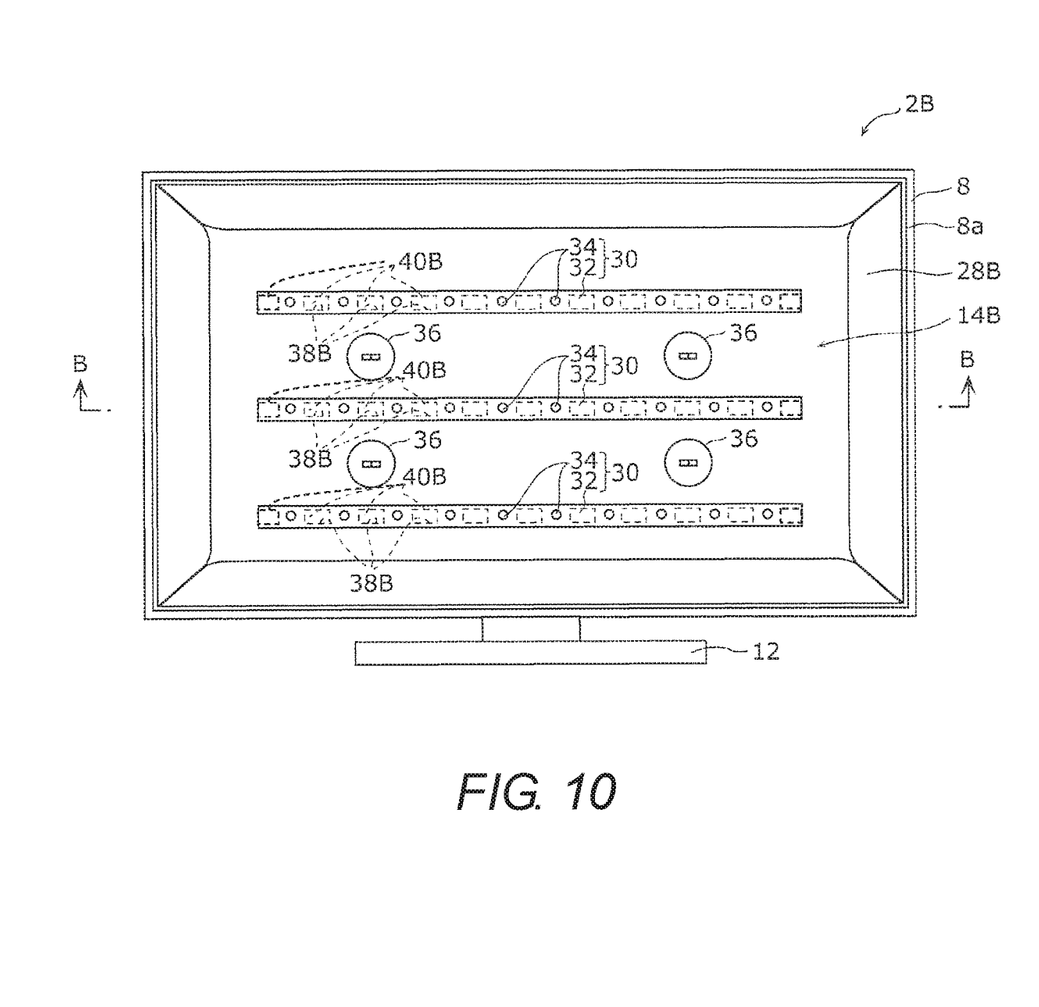
FIG. 10 is a front elevational view of the internal structure of a display device in accordance with a third embodiment.
Figure 11:
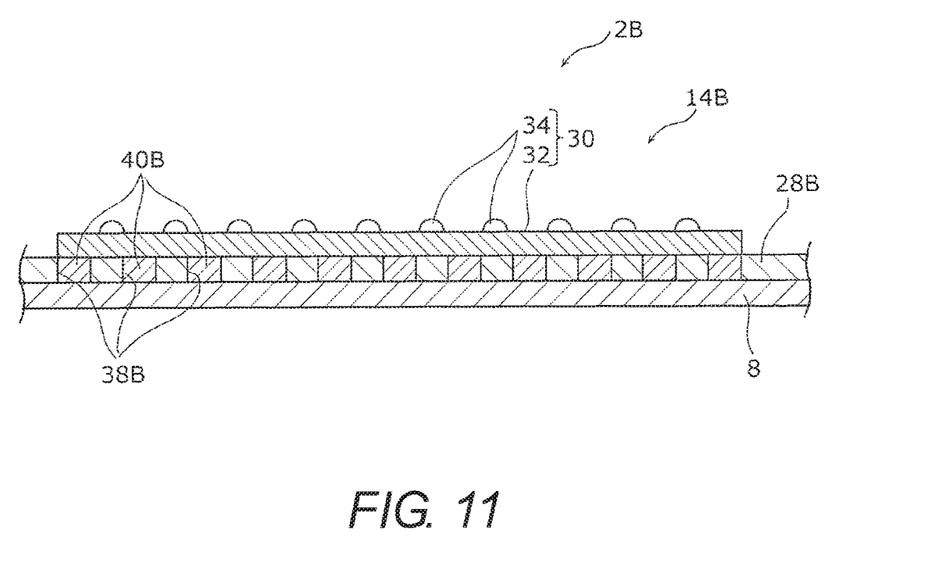
FIG. 11 is a cross sectional view of part of a backlight unit of the display device, taken along B-B line in FIG. 10.

Referring now to FIGS. 10 and 11, a display device 2B in accordance with a third embodiment will now be explained. In view of the similarity between the first to third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity. FIG. 10 is a front elevational view of the internal structure of the display device 2B in accordance with the third embodiment. FIG. 11 is a cross sectional view of part of a backlight unit 14B of the display device 2B, taken along B-B line in FIG. 10.

As shown in FIGS. 10 and 11, with the backlight unit 14B of the display device 2B in this embodiment, a reflective sheet 28B has a plurality of (eleven in FIG. 11) openings 38B for each of wiring boards 32. The openings 38B are disposed corresponding to the spaces between adjacent pairs of LEDs 34 out of the plurality of LEDs 34 for each of the wiring boards 32. A piece of double-sided adhesive tape 40B is disposed within each of the openings 38B. Consequently, the pieces of the double-sided adhesive tape 40B are disposed corresponding to the spaces between adjacent pairs of LEDs 34 out of the plurality of LEDs 34. Thus, in the illustrated embodiment, the double-sided adhesive tape 40B is disposed within the opening 38B of the reflective sheet 28B such that the double-sided adhesive tape 40 is attached to both the wiring board 32 and the rear frame 8.

The following effect can be obtained with the display device 2B in this embodiment. Heat from the LEDs 34 is transmitted to the rear frame 8 along a path that diverts around the reflective sheet 28B directly below and goes through the double-sided adhesive tape 40B. As a result, the heat transmission efficiency from the LEDs 34 to the rear frame 8 will be relatively low, which keeps the temperature of the rear frame 8 from rising. This allows the temperature of the rear frame 8 exposed on the outside of the display device 2B to be maintained at or below the standard temperature (such as 30° C.) recommended by UL standards.

Also, an air layer may be formed in place of the reflective sheet 28B directly under the LEDs 34 in order to divert the heat from the LEDs 34 around the reflective sheet 28B directly below, and transmit it to the rear frame 8. In the illustrated embodiment, the wiring board 32 can also include a white resist layer, which is identical to the white resist layer 33 as described in the first embodiment, to define a surface (e.g., a reflective surface) of the wiring board 32.

Fourth Embodiment

Figure 12:
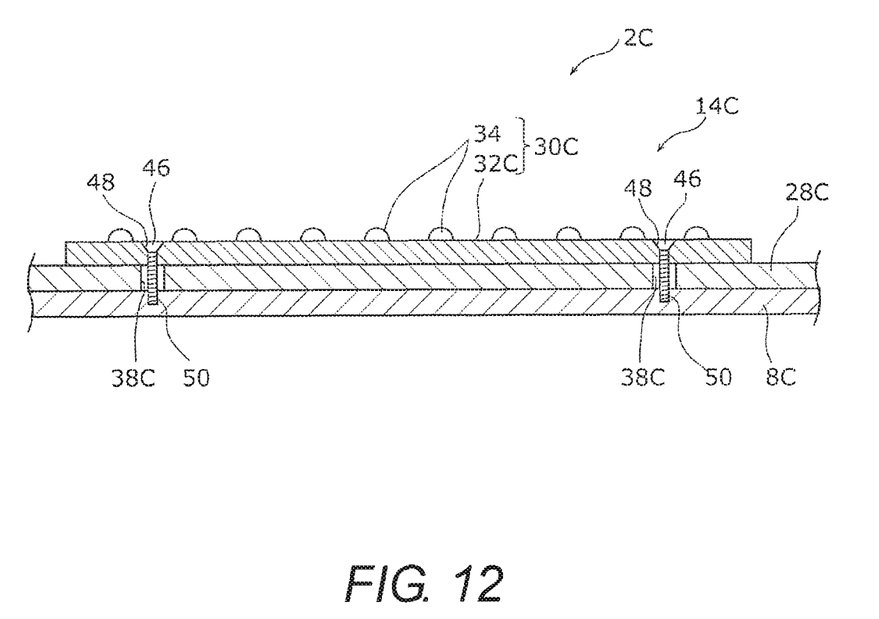
FIG. 12 is a cross sectional view of part of a backlight unit of a display device in accordance with a fourth embodiment.

Referring now to FIG. 12, a display device 2C in accordance with a fourth embodiment will now be explained. In view of the similarity between the first to fourth embodiments, the parts of the fourth embodiment that are identical to the parts of the first, second or third embodiment will be given the same reference numerals as the parts of the first, second or third embodiment. Moreover, the descriptions of the parts of the fourth embodiment that are identical to the parts of the first, second or third embodiment may be omitted for the sake of brevity. FIG. 12 is a cross sectional view of part of a backlight unit 14C of the display device 2C in accordance with the fourth embodiment.

As shown in FIG. 12, with the backlight unit 14C of the display device 2C in this embodiment, each of wiring boards 32C is fixed to a rear frame 8C by using a pair of screws 46 (e.g., fixing members) instead of the double-sided adhesive tape 40 or 40B discussed above.

Specifically, each of the wiring boards 32C of LED bars 30C has a pair of through-holes 48 for inserting the screws 46. Also, with the display device 2C, a reflective sheet 28C has a pair of openings 38C corresponding to the through-holes 48 for each of the wiring boards 32C. The openings 38C are each circular in shape, and have a diameter that is slightly larger (such as about a few millimeters) than the diameter of the screws 46. Furthermore, the refer frame 8C has a pair of threaded holes 50 for threading in the screws 46 corresponding to the through-holes 48 for each of the wiring boards 32C.

Each of the wiring boards 32C is fixed to the rear frame 8C by threading the screws 46 into the threaded holes 50 through the through-holes 48 and the openings 38C. The same effect can be obtained with this configuration as with the first embodiment above. The wiring boards 32C can be easily positioned with respect to the reflective sheet 28C by aligning the through-holes 48 with the openings 38C. Thus, in the illustrated embodiment, the screw 46 extends through the though-hole 48 of the wiring board 32C and the opening 38C of the reflective sheet 28C and is threaded into the threaded hole 50 of the rear frame 8C. In the illustrated embodiment, the wiring board 32 can also include a white resist layer, which is identical to the white resist layer 33 as described in the first embodiment, to define a surface (e.g., a reflective surface) of the wiring board 32.

The display devices in accordance with the first to fourth embodiments of the present invention were described above, but the present invention is not limited to or by these embodiments. For example, the various embodiments given above may be combined with one another.

In the above embodiments, the display device is a liquid crystal television receiver, but this is not the only option. For example, the display device may be a liquid crystal monitor used for a personal computer.

In the above embodiments, the wiring board is formed from aluminum, but this is not the only option. For example, the wiring board may instead be formed from a glass epoxy resin.

In the first to third embodiments above, thermally conductive double-sided adhesive tape is used as the fixing member, but this is not the only option. The double-sided adhesive tape that is not thermally conductive may be used as the fixing member instead.

The display device of the present invention can be applied as a liquid crystal television receiver, for example.

In the illustrated embodiment, the display device in accordance with one aspect is a display device for displaying images. The display device includes a display panel configured to display an image, a rear face housing disposed rearward with respect to a rear face of the display panel, a substrate disposed between the display panel and the rear face housing, at least one light source mounted on the substrate and configured to emit light toward the rear face of the display panel, a reflective sheet partially sandwiched between the substrate and the rear face housing, the reflective sheet having an opening at a location where the substrate is disposed, and a fixing member fixedly attaching the substrate to the rear face housing through the opening.

With this aspect, the fixing member fixes the substrate to the rear face housing through the opening in the reflective sheet. Consequently part of the reflective sheet is sandwiched between the substrate and the rear face housing, and the substrate and the reflective sheet are fixed together. As a result, the substrate and the reflective sheet are fixed together without having to use a conventional holder, so it is less likely that light from the light source will be blocked, regardless of the layout of the light source. This affords greater latitude in the optical layout of the light source. Furthermore, since the conventional can be eliminated, the cost of manufacturing the display device can be reduced by a corresponding amount.

With the display device in accordance with an aspect, the substrate has a white resist layer on a surface of the substrate on which the light source is mounted.

With this aspect, since a white resist layer is formed on the side of the substrate where the light source is mounted, part of the light from the light source will be reflected by the substrate. This allows the light from the light source to be efficiently guided to the display panel.

With the display device in accordance with an aspect, the fixing member includes a double-sided adhesive tape.

With this aspect, since the fixing member includes a double-sided adhesive tape, the substrate can be easily fixed to the rear face housing by putting the double-sided adhesive tape through the opening in the reflective sheet and locating it between the substrate and the rear face housing.

With the display device in accordance with an aspect, the double-sided adhesive tape may have thermal conductivity.

With this aspect, since the double-sided adhesive tape has thermal conductivity, heat from the light source can be transmitted through the double-sided adhesive tape to the rear face housing. This allows the heat from the light source to be dissipated from the rear face housing, and improves the heat dissipation effect.

With the display device in accordance with an aspect, the fixing member may include a screw.

With this aspect, since the fixing member includes a screw, the substrate can be easily fixed to the rear face housing by screwing the substrate to the rear face housing.

With the display device in accordance with an aspect, the opening has a main opening that is covered by the substrate and within which the fixing member is disposed, and a slit that extends from the main opening and that is not covered by the substrate such that a distal end of the slit is exposed. Also, the substrate can have a marking for positioning the substrate with respect to the reflective sheet, and the substrate is positioned with respect to the reflective sheet by aligning the marking with the slit.

With this aspect, since the opening has a slit, and a marking is provided to the substrate, when the substrate is fixed to the rear face housing, the substrate can be easily positioned with respect to the reflective sheet by aligning the position of the marking with the position of the slit.

With the display device in accordance with an aspect, the at least one light source has a plurality of the light sources that are spaced apart from each other in a lengthwise direction of the substrate, and the opening is disposed closer to an end of the substrate in the lengthwise direction of the substrate than to a center of the substrate in the lengthwise direction of the substrate.

With this aspect, since the opening is disposed closer to the end in the lengthwise direction than to the center in the lengthwise direction of the substrate, heat from the center in the lengthwise direction of the substrate, which rises to a relatively high temperature, will be transmitted to the rear face housing along a path that diverts around the reflective sheet and so forth directly below and goes through the opening. As a result, since the heat transmission efficiency from the center in the lengthwise direction of the substrate to the rear face housing is relatively low, an increase in the temperature of the rear face housing can be suppressed.

With the display device in accordance with an aspect, the at least one light source has a plurality of the light sources that are disposed spaced apart from each other in a lengthwise direction of the substrate, and the opening is disposed corresponding to a space between an adjacent pair of the light sources.

With this aspect, since the opening is disposed corresponding to the space between the adjacent pair of the light sources, any heat from the light sources will be transmitted to the rear face housing along a path that diverts around the reflective sheet and so forth directly below, and goes through the opening. As a result, since the heat transmission efficiency from the light sources to the rear face housing is relatively low, an increase in the temperature of the rear face housing can be suppressed.

With the display device in accordance with an aspect, the display device can be manufactured at a lower cost, and greater latitude is afforded in the optical layout in disposing the light source.

In accordance with a first aspect, a display device comprises: a display panel configured to display an image; a rear face housing disposed rearward with respect to a rear face of the display panel; a substrate disposed between the display panel and the rear face housing; at least one light source mounted on the substrate and configured to emit light toward the rear face of the display panel; a reflective sheet partially sandwiched between the substrate and the rear face housing, the reflective sheet having an opening at a location where the substrate is disposed; and a fixing member fixedly attaching the substrate to the rear face housing through the opening.

In accordance with a second aspect, with the display device according to the first aspect, the substrate has a white resist layer on a surface of the substrate on which the light source is mounted.

In accordance with a third aspect, with the display device according to the first aspect, the fixing member includes a double-sided adhesive tape.

In accordance with a fourth aspect, with the display device according to the third aspect, the double-sided adhesive tape has thermal conductivity.

In accordance with a fifth aspect, with the display device according to the third aspect, the double-sided adhesive tape is disposed within the opening of the reflective sheet such that the double-sided adhesive tape is fixedly attached to both the substrate and the rear face housing.

In accordance with a sixth aspect, with the display device according to the first aspect, the fixing member includes a screw.

In accordance with a seventh aspect, with the display device according to the sixth aspect, the screw extends through a though-hole of the substrate and the opening of the reflective sheet and is threaded into a threaded hole of the rear face housing.

In accordance with an eighth aspect, with the display device according to the first aspect, the opening has a main opening that is covered by the substrate and within which the fixing member is disposed, and a slit that extends from the main opening and that is not covered by the substrate such that a distal end of the slit is exposed.

In accordance with a ninth aspect, with the display device according to the eighth aspect, the main opening has an overall rectangular shape, and the slit extends from an end of the main opening in a direction perpendicular to a lengthwise direction of the main opening, and has a larger dimension in the direction than the main opening.

In accordance with a tenth aspect, with the display device according to the eighth aspect, the substrate has a marking for positioning the substrate with respect to the reflective sheet, and the substrate is positioned with respect to the reflective sheet by aligning the marking with the slit.

In accordance with an eleventh aspect, with the display device according to the first aspect, the at least one light source has a plurality of the light sources that are spaced apart from each other in a lengthwise direction of the substrate, and the opening is disposed closer to an end of the substrate in the lengthwise direction of the substrate than to a center of the substrate in the lengthwise direction of the substrate.

In accordance with a twelfth aspect, with the display device according to the first aspect, the at least one light source has a plurality of the light sources that are spaced apart from each other in a lengthwise direction of the substrate, and the opening is disposed corresponding to a space between an adjacent pair of the light sources.

In accordance with a thirteenth aspect, with the display device according to the second aspect, the fixing member includes a double-sided adhesive tape.

In accordance with a fourteenth aspect, with the display device according to the thirteenth aspect, the double-sided adhesive tape has thermal conductivity.

In accordance with a fifteenth aspect, with the display device according to the thirteenth aspect, the double-sided adhesive tape is disposed within the opening of the reflective sheet such that the double-sided adhesive tape is attached to both the substrate and the rear face housing.

In accordance with a sixteenth aspect, with the display device according to the second aspect, the fixing member includes a screw.

In accordance with a seventeenth aspect, with the display device according to the sixteenth aspect, the screw extends through a though-hole of the substrate and the opening of the reflective sheet and is threaded into a threaded hole of the rear face housing.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front, and the "left" when referencing from the left side as viewed from the front.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a display panel;
a rear face housing disposed rearward with respect to a rear face of the display panel;
a light source unit disposed between the display panel and the rear face housing;
a reflective sheet having an opening, a portion of the reflective sheet around the opening being disposed between at least part of the light source unit and the rear face housing in a direction perpendicular to a surface of the display panel; and
a fixing member attaching the light source unit to the rear face housing.

2. The display device according to claim 1, wherein
the portion of the reflective sheet around the opening is engaged with the part of the light source unit to retain the reflective sheet with respect to the rear face housing.

3. The display device according to claim 1, wherein
the light source unit includes a substrate that is disposed between the display panel and the rear face housing, and at least one light source that is mounted on the substrate and emits light toward the rear face of the display panel.

4. The display device according to claim 3, wherein
the reflective sheet is disposed between part of the light source and the rear face housing.

5. The display device according to claim 3, wherein
the portion of the reflective sheet around the opening directly contacts with the substrate.

6. The display device according to claim 3, wherein
the substrate has a white resist layer on a surface of the substrate on which the light source is mounted.

7. The display device according to claim 3, wherein
the at least one light source has a plurality of the light sources that are spaced apart from each other in a lengthwise direction of the substrate.

8. The display device according to claim 7, wherein
the opening has a plurality of openings that are spaced apart from each other in the lengthwise direction of the substrate.

9. The display device according to claim 8, wherein
a number of the openings is at least a number of the light sources.

10. The display device according to claim 8, wherein
the openings are arranged with respect to each other at an interval corresponding to an interval of the light sources.

11. The display device according to claim 3, wherein
the opening of the reflective sheet is located at a location where the light source is disposed.

12. The display device according to claim 3, wherein
the fixing member fixedly couples the substrate to the rear face housing.

13. The display device according to claim 3, wherein
the fixing member includes a double-sided adhesive tape that is attached to a surface of the substrate that is opposite to a surface on which the light source is mounted.

14. The display device according to claim 1, wherein
the fixing member includes a double-sided adhesive tape.

15. The display device according to claim 14, wherein
the double-sided adhesive tape has thermal conductivity.

16. The display device according to claim 14, wherein
the double-sided adhesive tape is fixedly attached to both the light source unit and the rear face housing.

17. The display device according to claim 1, wherein
the fixing member includes a screw.

18. The display device according to claim 17, wherein
the screw extends through a though-hole of the light source unit and is threaded into a threaded hole of the rear face housing.

19. The display device according to claim 1, wherein
the opening has
a main opening that is covered by the part of the light source unit, and
an extension opening that extends from the main opening and that is not covered by the part of the light source unit such that a distal end of the extension opening is exposed.

20. A display device comprising:
a display panel;
a rear face housing disposed rearward with respect to a rear face of the display panel;
a light source unit disposed between the display panel and the rear face housing;
a reflective sheet having an opening, a portion of the reflective sheet around the opening being disposed between at least part of the light source unit and the rear face housing in a direction perpendicular to a surface of the display panel; and
a fixing member attaching the light source unit to the rear face housing,
the portion of the reflective sheet around the opening being engaged with the part of the light source unit to retain the reflective sheet with respect to the rear face housing,
the light source unit including a substrate that is disposed between the display panel and the rear face housing, and at least one light source that is mounted on the substrate and emits light toward the rear face of the display panel,
the opening of the reflective sheet being located at a location where the substrate is disposed.

* * * * *